(12) United States Patent
Hurwitz

(10) Patent No.: US 7,997,235 B2
(45) Date of Patent: Aug. 16, 2011

(54) OMNIDIRECTIONALLY REFLECTIVE PET LEASH

(75) Inventor: Marni Markell Hurwitz, Far Hills, NJ (US)

(73) Assignee: NITE Glow INDUSTRIES, Far Hills, NJ (US)

( * ) Notice: Subject to any disclaimer, the term of this patent is extended or adjusted under 35 U.S.C. 154(b) by 342 days.

(21) Appl. No.: 12/286,814

(22) Filed: Oct. 2, 2008

(65) Prior Publication Data

US 2010/0083912 A1    Apr. 8, 2010

(51) Int. Cl.
*A01K 27/00* (2006.01)

(52) U.S. Cl. ............................ 119/793; 119/795

(58) Field of Classification Search .............. 119/793, 119/856, 859, 792, 797, 798; 359/516
See application file for complete search history.

(56) References Cited

U.S. PATENT DOCUMENTS

| | | | | |
|---|---|---|---|---|
| 752,414 A * | 2/1904 | Price | ................................ | 87/2 |
| 2,939,271 A * | 6/1960 | Alvin | ............................. | 57/211 |
| 3,176,584 A | 4/1965 | De vries | ........................ | 359/539 |
| 3,190,178 A | 6/1965 | McKenzie | .................... | 359/514 |
| 3,871,336 A | 3/1975 | Bergman | ....................... | 119/106 |
| 3,934,065 A * | 1/1976 | Tung | ................................ | 428/76 |
| 3,999,521 A | 12/1976 | Puiello | ........................... | 359/518 |
| 4,025,159 A | 5/1977 | McGrath | ....................... | 359/514 |
| 4,167,156 A | 9/1979 | Kupperman et al. | ......... | 119/795 |
| 4,173,201 A | 11/1979 | Chao | ............................. | 119/859 |
| 4,384,548 A | 5/1983 | Cohn | ............................ | 359/518 |
| 4,407,233 A | 10/1983 | Bozzacco | .................... | 359/518 |
| 4,513,692 A | 4/1985 | Kuhnsman et al. | ........... | 119/797 |
| 4,576,850 A | 3/1986 | Martens | ........................ | 428/156 |
| 4,582,885 A | 4/1986 | Barber | ........................... | 528/28 |
| 4,668,558 A | 5/1987 | Barber | .......................... | 428/156 |
| 4,735,035 A * | 4/1988 | Mattioli | ............................. | 54/34 |
| 4,763,985 A | 8/1988 | Bingham | ...................... | 359/518 |
| 4,777,784 A * | 10/1988 | Ferguson | ........................... | 54/34 |
| 4,815,818 A | 3/1989 | Thomas | ........................ | 359/546 |
| 4,887,552 A | 12/1989 | Hayden | ......................... | 119/793 |
| 4,895,110 A | 1/1990 | LoCascio | ...................... | 119/859 |
| 4,950,525 A | 8/1990 | Bailey | ............................ | 428/164 |
| 4,957,335 A | 9/1990 | Kuney | ........................... | 359/541 |
| 5,046,456 A | 9/1991 | Heyman et al. | ............... | 119/859 |
| 5,066,098 A | 11/1991 | Kult et al. | ..................... | 359/540 |
| 5,117,304 A | 5/1992 | Huang et al. | .................. | 359/529 |
| 5,140,946 A | 8/1992 | Pennock et al. | .............. | 119/859 |
| 5,200,262 A | 4/1993 | Li | ................................ | 442/379 |
| 5,237,448 A | 8/1993 | Spencer et al. | ............... | 119/792 |
| 5,243,457 A | 9/1993 | Spencer | ........................ | 119/795 |
| 5,247,906 A * | 9/1993 | Stevenson | ..................... | 119/795 |

(Continued)

*Primary Examiner* — Yvonne R. Abbott
(74) *Attorney, Agent, or Firm* — Ernest D. Buff; Ernest D. Buff & Associates, LLC; Harry Aragnostopoulos

(57) ABSTRACT

A flexible omnidirectionally reflective pet leash and collar having a handle and a cylindrical central core is housed within a cylindrical omnidirectionally reflective sleeve that reflect an incoming light beam back in the same direction as it is emanated. The reflected light beam provides accurate illumination of the pet owner's hand, pet leash and the location of the pet during dusk or nighttime hours. This flexible omnidirectionally reflective pet leash is created by surrounding a central core with a cylindrically reflective sleeve comprising a flexible retroreflective sheet and being operable to surround the central cylindrical core thereby providing omnidirectional reflectivity. The flexible retroreflective sheet has retroreflectors bonded thereto with a transparent bond layer. Due to the circular construction of the cylindrically reflective sleeve, the reflective pet leash reflects light omnidirectionally over a large angle of acceptance, illuminating the pet owner's hand, the leash itself, and the pet's collar, thereby providing an improved measure of safety for both the pet and the pet handler.

32 Claims, 6 Drawing Sheets

U.S. PATENT DOCUMENTS

| | | | | |
|---|---|---|---|---|
| 5,283,101 | A | 2/1994 | Li | 428/141 |
| 5,370,082 | A | 12/1994 | Wade | 119/859 |
| 5,415,911 | A * | 5/1995 | Zampa et al. | 428/41.8 |
| 5,429,075 | A | 7/1995 | Passarella | 119/795 |
| 5,515,247 | A * | 5/1996 | Cheung et al. | 362/84 |
| 5,523,927 | A | 6/1996 | Gokey | 362/103 |
| 5,535,106 | A * | 7/1996 | Tangen | 362/108 |
| 5,558,044 | A | 9/1996 | Nasser, Jr. | 119/796 |
| 5,630,382 | A | 5/1997 | Barbera et al. | 199/859 |
| 5,749,326 | A * | 5/1998 | Jones et al. | 119/798 |
| 5,762,029 | A | 6/1998 | DuBois et al. | 119/796 |
| 5,777,790 | A * | 7/1998 | Nakajima | 359/536 |
| 5,850,807 | A * | 12/1998 | Keeler | 119/799 |
| 5,882,796 | A | 3/1999 | Wilson et al. | 428/411.1 |
| 5,910,858 | A * | 6/1999 | Frey et al. | 359/534 |
| 5,926,314 | A | 7/1999 | Smith et al. | 359/530 |
| 5,962,108 | A * | 10/1999 | Nestegard et al. | 428/172 |
| 5,967,095 | A | 10/1999 | Greves | 119/795 |
| 5,988,822 | A * | 11/1999 | Abe et al. | 359/541 |
| 6,070,556 | A * | 6/2000 | Edwards | 119/792 |
| 6,085,698 | A * | 7/2000 | Klein | 119/859 |
| 6,159,537 | A | 12/2000 | Crandall | 427/163.4 |
| 6,159,878 | A * | 12/2000 | Marsh | 442/132 |
| 6,166,856 | A * | 12/2000 | Araki et al. | 359/627 |
| 6,168,876 | B1 * | 1/2001 | Thorp et al. | 428/690 |
| 6,170,968 | B1 | 1/2001 | Caswell | 362/469 |
| 6,289,849 | B1 | 9/2001 | Macedo et al. | 119/796 |
| 6,557,498 | B1 | 5/2003 | Smierciak et al. | 119/858 |
| 6,656,566 | B1 * | 12/2003 | Kuykendall et al. | 428/138 |
| 6,677,028 | B1 | 1/2004 | Lasch et al. | 428/161 |
| 6,854,163 | B1 * | 2/2005 | Ruana | 16/431 |
| 6,869,201 | B2 * | 3/2005 | Kruger | 362/191 |
| 6,925,965 | B1 * | 8/2005 | Hurwitz | 119/793 |
| 6,925,967 | B1 * | 8/2005 | Woodruff | 119/859 |
| 6,976,762 | B2 * | 12/2005 | Chien | 362/84 |
| 7,114,467 | B2 * | 10/2006 | Jones | 119/795 |
| 7,140,327 | B2 * | 11/2006 | Morehead | 119/859 |
| 7,246,477 | B2 * | 7/2007 | Hurwitz | 54/24 |
| 7,293,531 | B2 * | 11/2007 | Young, III | 119/798 |
| 7,367,285 | B2 * | 5/2008 | Cooper | 119/795 |
| 7,565,751 | B2 * | 7/2009 | Murray | 33/755 |
| 7,587,845 | B1 * | 9/2009 | Perez | 40/542 |
| 7,594,482 | B1 * | 9/2009 | Toplin | 119/792 |

* cited by examiner

OMNIDIRECTIONALLY REFLECTIVE PET LEASH

BACKGROUND OF THE INVENTION

1. Field of the Invention

The present invention relates to pet leashes; and more particularly, to an omnidirectionally reflective pet leash especially suited for use during dusk or nighttime hours to enhance safety of pets and their owners while walking in the vicinity of land vehicles.

2. Description of the Prior Art

Walking a pet during dusk or nighttime hours can be hazardous in neighborhoods where automobiles are encountered. Illuminating characteristics of automobile headlamps, generally afford an illumination range of approximately 25 to 50 feet. This illumination range can be significantly reduced by mist or fog, or bends in the road. Despite improvements to vehicle headlights, pets and their owners are oftentimes not recognized by automobile drives until the distance between the automobile and the pet is small.

Several approaches devised by prior art workers attempt to provide solutions for this hazardous common activity. These approaches include 1) use of pet collars that are illuminated or reflective; 2) use of leashes which are illuminated or reflective; or 3) a combination of both features. None of these solutions suggest indicating the whereabouts of a pet owner, a leash and a pet attached to the leash via omnidirectional reflection.

Various types of illuminated dog collars using bulb or other powered sources are known in the art. These power-illuminated leashes require batteries, light bulbs or other lighting elements, which are not needed for reflective illumination. Accordingly, a detailed discussion thereof is not required.

U.S. Pat. No. 4,173,201 to Chao et al. discloses an illuminated collar for pets and the like. U.S. Pat. No. 4,513,692 to Kuhnsman et al. discloses an illuminated pet leash comprising a non-opaque tube that contains one or more bundles of optical fibers. U.S. Pat. No. 4,895,110 to Lo Cascio discloses a pet collar that includes a light source and a power source attached to a strap. U.S. Pat. No. 4,887,552 to Hayden discloses an electrically lighted pet leash that is composed of a transparent, flexible tube containing a string of small electric light bulbs mounted in parallel between two insulated wires. U.S. Pat. No. 5,046,456 to Heyman et al. discloses an illuminated pet collar in which multiple lights are mounted within a flexible, light-permeable tube that extends about the perimeter of the collar. A housing mounted on one end of the tube contains a circuit and a battery for operating the lights. U.S. Pat. No. 5,140,946 to Pennock et al. discloses an illuminated pet collar with miniature lights powered by a battery encased within a flexible, pliable, transparent plastic display tube, which are parallel-wired within the display tube. U.S. Pat. No. 5,370,082, to Wade discloses an animal collar that includes illuminating devices, such as light emitting diodes, liquid quartz strips or electric lamps powered by a plurality of solar cells. U.S. Pat. No. 5,429,075 to Passarella et al. discloses a pet leash and flashlight combination. U.S. Pat. No. 5,523,927 to Gokey discloses an illuminated animal collar light emitting diode placed on the outer exterior of a collar powered by a battery. U.S. Pat. No. 5,535,106, issued to Tangen, discloses a lighted animal collar that includes a plurality of separate light emitting assemblies, or housings, at spaced intervals along the collar. U.S. Pat. No. 5,558,044 to Nasser, Jr. et al. discloses an illuminating leash handle with a flashlight. U.S. Pat. No. 5,630,382 to Barbera et al. discloses an illuminated pet harness having straps with internal cavities that contain fiber optic cores illuminated by a light bulb. U.S. Pat. No. 5,762,029 to DuBois et al. discloses a combined retractable leash and flashlight. U.S. Pat. No. 5,850,807 to Keeler discloses an illuminated pet leash, wherein illumination is remotely activated by a pet owner to locate the leash. U.S. Pat. No. 5,967,095 to Greves discloses an electroluminescence-illuminated pet flat leash strap. U.S. Pat. No. 6,170,968 to Caswell discloses a motion activated rotatable illuminator. U.S. Pat. No. 6,289,849 to Macedo et al. discloses a device for removably attaching a flashlight to a retractable dog leash. U.S. Pat. No. 6,557,498 to Smierciak et al. discloses a night safety pet illumination marker, with a pet collar having a series of light emitting diodes mounted around the perimeter of the collar and powered by battery power.

Various types of dog collars illuminated by reflection are known in the art. Representative dog collars of this variety are discussed below.

U.S. Pat. No. 3,871,336 to Bergman discloses a reflective dog collar which is not illuminated; but which utilizes a highly reflective material having the form of different color dots encapsulated in plastic. This illuminates only portions of the flat planar pet collar.

U.S. Pat. No. 3,999,521 to Puiello discloses a reflective safety harness for quadruped animals. The harness includes a pair of identical sheet elements with a light reflective surface mounted on opposite sides of the animal. At the corners of the sheet are fastened straps, which circumscribe the animal's body at the front and rear of the harness. Extending from the front strap, at the top point thereof, midway between the two elements, is a loop through which the dog's regular collar is passed. The arrangement assures immovable attachment of the harness on the dog's body. The disclosure by the '521 patent of a reflective sheet positioned on both sides of the animal does not suggest a pet collar or a leash that reflects incident light.

U.S. Pat. No. 4,167,156 to Kupperman et al. discloses a reflective animal leather leash. The elongated leather animal leash includes a sewn a transparent polyvinyl chloride strip with a light reflective prism design on one surface. The light reflective prism is bonded by dielectric heat sealing or sonic welding to an opaque polyvinyl chloride strip sewn to the leather strip, resulting in a leash having a light reflective surface. Since the strip has a reflective surface on only one side of the leash, it does not reflect light in every direction. The flat leather leash is not easily twistable and is not readily bent without separating the transparent and opaque polyvinyl chloride layers.

U.S. Pat. No. 4,384,548 to Cohn discloses a safety device for animals. A pet collar uses "retro-reflective" threads with glass reflective elements in a flexible webbing to form a pet leash. The threads are said to reflect incident light directly back toward the source. Disposition of reflective threads in the webbing forming the collar is sparse. As a result, the quantum of incident light reflected is small; and an insignificant quantum of incident light is reflected back to the source.

U.S. Pat. No. 4,407,233 to Bozzaco discloses a safety collar for pets. The collar has highly reflective flexible elements with a length large enough to extend beyond the outer surface of the pet's hair. It uses flexible elements with Scotchlite reflecting strips attached to a collar. A reflective pet leash is not disclosed, and the flexible elements do not reflect light in every direction.

U.S. Pat. No. 5,243,457 to Spencer discloses a material with enhanced visibility characteristics. This flexible visibility enhancing material combines the advantages of a light reflective component and a luminescent component. The material includes a first layer of prismatic light reflective plastic material having an underlying surface formed with a plurality of minute prism-like formations projecting there from at regular spaced intervals, and an overlying substantially smooth light transmissive surface. Bonded, i.e. by heat-sealing, to the first layer is a second layer of plastic luminescent material. The second layer is contiguously and integrally attached to the underlying surface of the prism-like formations and generally coextensive therewith. The visibility enhancing material simultaneously radiates luminescent light from the second layer through the underlying surface of prism-like formations and through the smooth light transmissive surface and reflects light from the prism-like formations through the smooth light transmissive surface. In one embodiment, a leash for controlling and restraining a pet animal includes a flexible elongate member comprised of the visibility enhanced material. In another embodiment, the second layer is replaced with a layer of luminescent material, which can be selectively energized to become luminous. Since the transparent reflective material is a molded plastic of prismatic construction it is rigid and is not flexible and does not form a leash that is capable of being twisted and bent. Further any twisting and bending action separates the reflective element from the luminescent element.

U.S. Pat. No. 5,237,448 to Spencer et al. discloses a visibility enhancing material. The flexible visibility enhancing material combines the advantages of a light reflective component and a luminescent component. The material includes a first layer of prismatic light reflective plastic material having an underlying surface formed with a plurality of minute prism-like formations projecting therefrom at regular spaced intervals, and an overlying substantially smooth light transmissive surface. A second layer of plastic luminescent material is contiguously and integrally attached to the underlying surface of the prism-like formations and generally coextensive therewith. The visibility enhancing material simultaneously radiates luminescent light from the second layer through the underlying surface of the prism-like formations and through the smooth light transmissive surface, and reflects light from the prism-like formations through the smooth light transmissive surface. In one embodiment, a leash for controlling and restraining a pet animal includes a flexible elongate member comprised of the visibility enhanced material. Since the transparent reflective material is a molded plastic of prismatic construction, it is rigid and is not flexible and does not form a leash that is capable of being twisted and bent. Furthermore, any twisting and bending action will result in separation of the reflective element from the luminescent element.

U.S. Pat. No. 6,070,556 to Edwards discloses an illuminating dog safety system. This illuminating dog safety system is designed for allowing an animal to be more visible at night. The device includes a collar that is worn around a neck of an animal. The collar has a reflective strip extending a majority of its length. A harness is provided that is adapted to be worn around a torso of the animal. The harness is comprised of an upper strap member, a lower strap member, and a longitudinal extension there between. The upper strap member, the lower strap member, and the longitudinal extension each have a reflective strip extending a majority of a length thereof. A leash is provided that is adapted for securement to the collar. The leash has a reflective strip extending a majority of its length. All these strip elements are made from flat elements, as shown in FIG. 3 of the patent disclosure. Twisting the elements does not provide the reflectivity needed for adequate visibility at night.

Numerous patents disclose reflective materials. Some of these patents disclose reflective elements having corner cube shapes embedded in a rigid or flexible polymeric strips and monolayers of spherical beads, i.e. primarily glass beads bonded to a reflective sheet.

U.S. Pat. No. 3,176,584 to DeVries et al. discloses that a reinforcing layer may be incorporated into an embedded lens retroreflective sheeting. The reinforcing layer may be of a similar composition as the binder in which the microspheres are embedded. The layer may be applied to the back side of the secularly reflective layer via spraying, i.e., by a solvent-coating technique. Examples of the reinforcing layer materials disclosed include methyl methacrylate, flexible epoxy resins, chloro-sulfonated polyethylene, polystyrene, polypropylene, polycarbonate resin, ethyl cellulose, and cellulose acetate-butyrate. The reflective layer is typically very thin and fragile, i.e. in the order of 0.06 microns thick, and must be disposed in special relationship to the microspheres in order for the sheeting to provide useful retro-reflection.

U.S. Pat. No. 3,190,178 to McKenzie discloses a reflex reflective sheeting. It uses a monolayer of microspheres embedded in a polymer to reflect the incoming light beam in the same direction as the incident beam. Since the sheet is formed by melting of the polymeric binder, it is rigid and therefore unsuitable for flexible pet leashes.

U.S. Pat. No. 4,025,159 to McGrath discloses cellular retroreflective sheeting. The cellular retroreflective sheeting comprises a base layer of retroreflective elements and a transparent cover film supported in spaced relation away from the base layer by a network of narrow intersecting bonds. These bonds form hermetically sealed cells within which retroreflective elements are isolated from retroreflective elements of different cells. The resultant sheeting achieves greater durability through use of bonds that are cured in situ after they have been thermoformed into sealing contact between the cover film and base layer. The base material is coated with the binder, subjected to heat and pressure to displace the binder around the embedded microsphers or corner cubes forming the bonded network. Retroreflective articles so constructed may be rigid and inflexible.

U.S. Pat. No. 4,576,850 to Martens, and U.S. Pat. Nos. 4,582,885, 4,668,558 to Barber disclose a shaped plastic articles having replicated microstructure surfaces. This shaped plastic article is made by crosslinked polymer with hard and soft segments having a microstructure-bearing surface that is replicated, with a castable fluid, and radiation hardened. Articles formed by this process exhibit, a retroreflective cube-corner sheeting, Fresnel lens or video disc. All these formed articles are rigid and therefore unsuitable for use in pet leashes. Moreover, these articles also exhibit low tear strength.

U.S. Pat. No. 4,763,985 to Bingham discloses a launderable retroreflective appliqué that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material. The layers have varying refractive indices and are composed of a variety of binary metal compounds including oxides, sulfides, and fluorides.

U.S. Pat. No. 4,815,818 to Thomas discloses three-dimensional flexible reflectors. The reflector is provided with elastomeric resilient member with a plurality of embedded retroreflective glass beads. A portion of the outer surface of the elastomeric material is removed to expose the glass beads.

The exterior surface of the glass beads at the outer surface is exposed and is subject to abrasion.

U.S. Pat. No. 4,950,525 to Bailey discloses elastomeric retroreflective sheeting. The elastomeric retroreflective sheeting has a monolayer of non-stretchable microspheres. These microspheres are embedded in a sheet with a spacing layer of transparent elastomeric material underlying the back surface of the microspheres. A cover layer of transparent elastomeric material covers the front surface of the microspheres. A specularly reflective layer is disposed on the back surface of the spacing layer. The cover layer comprises a clear thermoplastic elastomeric aliphatic polyurethane.

U.S. Pat. No. 4,957,335 to Kuney discloses microsphere-based retro-reflective articles having high retroreflective brightness at narrow divergence or observation angles, i.e. up to 0.5 degrees. The article is made by selection of microspheres having defined combinations of average diameter and average refractive index. This patent teaches (column 4, lines 18-23) that variation in the size of the microspheres will increase the observation angle or divergence angle of the resultant retro-reflective article.

U.S. Pat. No. 5,066,098 to Kult et al. discloses cellular encapsulated-lens high whiteness retroreflective sheeting with a flexible cover sheet. This cellular, encapsulated-lens retroreflective sheeting comprises a base sheet of a monolayer of retroreflective elements that is partially embedded in a binder layer which typically is white. A cover sheet is disposed in spaced relation from the layer of retroreflective elements. A network of narrow intersecting bonds, or seal legs, that extend between the cover sheet and the base sheet with binder material are thermoformed at the point of contact between the base sheet and cover sheet. Such a rigid, reflective sheet is unsuitable for pet leashes, which require structures that can twist and flex.

U.S. Pat. No. 5,117,304 to Huang et al. discloses a retroreflective article. The retroreflective article has corner cubes and is flexible, and can be applied over irregular surfaces by using an optically clear, aliphatic polyurethane polymer. The aliphatic polymer has a plurality of hard chain segments having the formula —$C(O)N(H)$—$C_6H_{10}$—$N(H)C(O)$—.

U.S. Pat. No. 5,200,262 to Li discloses a launderable retroreflective appliqué. The appliqué employs a reflector that comprises elemental aluminum or elemental silver on the backside of the microspheres. The appliqué comprises a monolayer of metal-coated microspheres partially embedded in and partially protruding from a binder layer. The binder layer comprises a flexible polymer having hydrogen functionalities and one or more isocyanate-functional silane coupling agents. The disclosed flexible polymers that possess hydrogen functionalities are crosslinked, flexible urethane-based polymers, such as isocyanate-cured polymers or one or two component polyurethanes and polyols.

U.S. Pat. No. 5,283,101 to Li discloses a launderable retroreflective appliqué comprising a binder layer formed from an electron-beam curable polymer and typically one or more crosslinkers and silane coupling agents. Electron-beam curable polymers include chlorosulfonated polyethylenes, ethylene copolymers comprising at least about 70 weight percent of polyethylene, such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. When the appliqué is inverted, light comes through the binder layer.

U.S. Pat. No. 5,777,790 to Nakajima discloses a microsphere-based retroreflective article. The retroreflective article comprises a monolayer of microspheres partially embedded in and protruding from a binder layer and specular reflector underlying the microspheres. The monolayer of microspheres comprises a mixture of a first class of microspheres having a first refractive index and a second class of microspheres having a second refractive index. The second refractive index is higher than the first refractive index. As a result, the sheeting exhibits superior observation angle angularity.

U.S. Pat. No. 5,882,796 to Wilson et al. discloses bonded structured retroreflective sheeting. The structured retroreflective sheeting includes an array of corner cube structured retroreflective elements, a thermoplastic sealing film located proximate the structured elements, and bonding agent between the sealing film and the structured retroreflective elements. The bonding agent bonds the sealing film to the structured retroreflective film. This bonded structure is rigid and is unlikely to survive the flexing and twisting movements of a pet leash.

U.S. Pat. No. 5,926,314 to Smith et al. discloses a retroreflective cube corner article having scalene base triangles. The cube corner retroreflective article exhibits a wide range of retroreflective entrance angularity in at least one plane, and preferably in two or more planes. The structured surface has an array of cube corner elements formed by three intersecting sets of substantially parallel grooves. Each cube corner element includes a base triangle bonded by one groove from each of the three intersecting groove sets, the base triangle being scalene. The corner cube reflector is rigid and cannot be used for producing reflective leashes.

U.S. Pat. No. 5,962,108 to Nestegard et al. discloses a retroreflective polymer coated flexible fabric material and method of manufacture. The retroreflective polymeric coated flexible fabric material has a retroreflective layer and a polymeric compatibilizing layer welded to a polymeric coated outer surface of a flexible fabric material. The compatibilizing layer provides an intermediate layer between the retroreflective layer and the flexible fabric material, creating suitable bond strength between dissimilar polymers. Flexible fabric materials are polyester, nylon or cotton. The fabric is coated with highly plasticized polyvinyl chloride (PVC) or ethylene acrylic acid copolymer (EAA). These polymers are flexible, durable, and resistant to abrasion. The retroreflective prismatic elements layer includes: acrylic polymers, such as poly (methylmethacrylate); polycarbonates; cellulosics; polyesters such as poly(butyleneterephthalate); poly (ethyleneterephthalate); fluoropolymers; polyamides; polyetherketones; poly(etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. The compatibilizing layer that is suitable for bonding between a retroreflective layer and a flexible fabric material include: polyurethane, ethylene methyl acrylate copolymer, ethylene N-butyl acrylate copolymer, ethylene ethyl acrylate copolymer, ethylene vinyl acetate copolymer, polymerically plasticized PVC, and polyurethane primed ethylene acrylic acid copolymer. Such a reflective fabric does not suggest the shape, construction or function of a pet leash.

U.S. Pat. No. 5,910,858 to Frey discloses retroreflective sheeting with a coated back surface. The retroreflective sheet has a plurality of indentations on the back surface to reflect the light, and a transparent front surface to encapsulate and protect the light reflecting indentations. This reflective sheet is rigid and is unsuitable for use in pet leashes.

U.S. Pat. No. 6,159,537 to Crandall discloses a method of making a retroreflective article that has a binder layer containing an epoxy resin and silicone crosslinked polymer. A pre-binder composition comprises about 5 to about 40 parts of an epoxy resin. About 60 to about 95 parts of an alkoxysilane terminated polymer is applied to a retroreflective layer and then cured to form a binder layer that is adhered to the retroreflective layer and an article of clothing. The binder composition does not cover the exterior surface of the reflective layer and does not provide abrasion resistance.

U.S. Pat. No. 6,677,028 to Lasch, et al. discloses retroreflective articles having multilayer films and methods of manufacturing same. These retroreflective articles have multilayer films and are useful for commercial graphics and retroreflective products, such as roll-up signs for highway transportation safety. The articles comprise multilayer films having at least one layer of polyurethane and a core layer of a copolymer of alkylene and a bond layer of non-acidic, polar co-monomer including, ethylene copolymer, vinyl acetate, acrylate, EVA, acid-modified EVA, anhydride-modified EVA, acid-acrylate-modified EVA, anhydride-acrylate-modified EVA, EEA, EMA, AEA, EVACO, EBACO, and EnBA. The glass retroreflective beads comprise an air-exposed portion or have an overlay polyurethane or EAA cover film. When retroreflective glass beads are exposed to air, they are subject to wear.

Notwithstanding the efforts of prior art workers to construct pet leashes and pet collars that are illuminated by incident light, there remains a need in the art for a flexible, preferably abrasion resistant, pet leash that omnidirectionally reflects a significant quantum of incoming light back to its source. Further needed is an omnidirectionally reflective pet leash wherein the reflective properties substantially cover the entire surface of a leash and, preferably, pet collar. Numerous methods for producing retroreflectors have been disclosed. A flexible pet leash having a robust construction that withstands tensile and torsional forces attending leash usage, has long been needed in the art. Also needed is a flexible, omnidirectional abrasion resistant pet leash capable of maintaining high reflectivity when subjected to surface abrasion from frictional forces created by contact of the leash with objects having rough exteriors, such as the ground, flooring, posts, trees and the like.

SUMMARY OF THE INVENTION

The present invention provides a pet leash that is omnidirectionally reflective. Omnidirectional reflectivity is provided by the incorporation of retroreflective corner cube reflectors or microsphere reflective elements. With this structure, the leash reflects a significant quantum of the incident light from a car head light or other light emitting element back to the source. Preferably, abrasion resistance properties are provided by the pet leash by utilizing a transparent coating. One such coating comprises a polymer that is transparent, flexible and has a refractive index significantly smaller than that of the retroreflective elements used. Abrasion resistance and omnidirectional reflectivity is achieved by first creating a flexible retroreflective sheet comprising a plurality of corner cube reflectors bonded via a transparent bond to a flexible polymeric sheet, or several microspheres bonded via a transparent bond to a reflectorized flexible polymeric sheet. Secondly, the cylindrical retroreflective sleeve is formed. Formation of the cylindrical retroreflective sleeve can be achieved in two ways: (i) by directly folding the flexible retroreflective sheet to form the cylindrical retroreflective sleeve providing omnidirectional reflectivity; or (ii) by bonding the flexible retroreflective sheet to a panel, which in turn is folded to form the cylindrical retroreflective sleeve providing omnidirectional reflectivity. The cylindrical retroreflective sleeve integrally surrounds a central cylindrical leash core to thereby create a leash having an external retroreflector surface. Preferably, the external surface of the cylindrical retroreflective sleeve is coated with a transparent, flexible abrasion resistant coating having a refractive index significantly less than that of the retroreflective elements. The thickness of the transparent abrasion resistant coating is in the range of 0.002 to 0.010 inches.

The proximal end of the leash is formed into a loop that defines a leash handle. The retroreflective cylindrical sleeve present on the handle covers the handle so that the handle is surrounded by the cylindrical retroreflective sleeve, closing the loop. Thus the handle also reflects the incident light from a car's headlights back to the source illuminating the position of the hand that is holding the pet. The distal end of the leash is attached to mechanical hardware, preferably a spring-type clip appointed for attachment to a pet collar. The collar in turn also preferably has the omnidirectionally reflective properties as the leash. Alternatively, the distal end of the leash is attached to mechanical hardware such as a metallic ring, forming a choke collar that encircles the neck of the pet creating a retroreflective collar integrated within the constructs of the leash itself. In another embodiment, the distal end of the leash has an adjustable metallic strip with one or more hole locations that lock with a pet leash clamp forming a reflective pet collar that is non-choking. Preferably, the transparent abrasion resistant coating is applied to the entire length of the pet leash between the proximal and distal ends.

The cylindrical character of the flexible cylindrical sleeve reflects a significant quantum of incident light back to the source since the entire sleeve has the flexible retroreflective sheet with the a plurality of corner cube reflectors bonded via a transparent bond to a flexible polymeric sheet, or several microspheres bonded via a transparent bond to a reflectorized flexible polymeric sheet. Thus, the sleeve, no matter what angle it is presented at, reflects a large quantum of light back to the light emitting source. Further, the flexibility of the transparent abrasion resistant coating provides for flexing and twisting movement of the pet leash without coating separation or delamination.

Optimally, the external surface of the cylindrical retroreflective sleeve is coated with a transparent, flexible abrasion resistant polymeric coating. The coating has a refractive index significantly less than that of retroreflective elements. Typically the retroreflective elements have a refractive index of 1.9 to 2.2 and the flexible transparent abrasion resistant polymeric coating has a refractive index of 1.3 to 1.55. A 0.002 to 0.010 inch layer of transparent flexible abrasion resistant polymeric coating does not affect the path of normally incident incoming light beam. With such a coating alteration of the path of inclined incident light beam is minimal. Similarly, the reflected light beam path is not severely affected. The internal reflection property of the retroreflective elements is not deteriorated since the abrasion resistant coating has significantly lower refractive index, as compared to that of the retroreflective elements.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

Figure 1A:
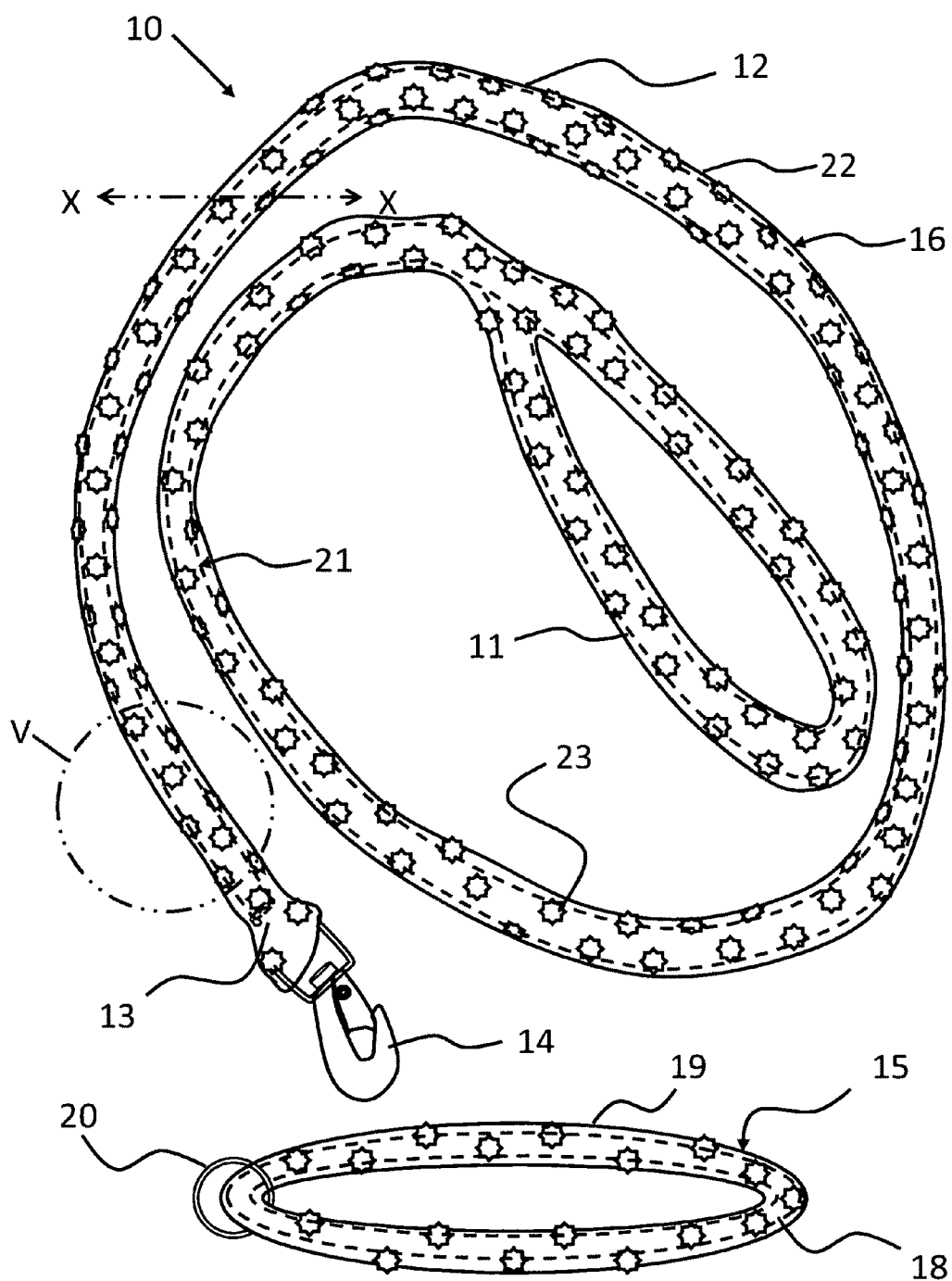
FIG. 1a is a schematic view of the reflective pet leash showing a leash having a reflective cylindrical sleeve with pattern portions (shown as jewels) attached thereto and covering a central core, wherein the reflective leash includes a proximal end looped to form an omnidirectionally reflective handle, and the distal end is attached to a metallic hardware component operable with a pet collar (shown)

The present invention provides a pet leash that is flexible, twistable and omnidirectionally reflective. It has an integrally formed handle in the proximal end of the leash, which is also omnidirectionally reflective. The distal end of the pet leash has metallic hardware, such as a spring clip adapted to be attached to a pet color, or has a ring that is integrally formed within the leash yielding a choke pet collar. The handle, pet leash, and the collar of the pet leash are all omnidirectionally reflective reflecting incident light back to its source, thereby clearly defining the pet owner's hand that has the leash, the pet leash and the neck portion of the pet that carries the choke collar. This increases the margin of safety in dusk or night time environments when a car headlight can illuminate the owner walking a pet and the pet, reducing the possibility of accidents. Since the omnidirectionally reflecting pet leash reflects light over a broad range, due to its reflective cylindrical sleeve arrangement, the headlight can be at a significant angle and could still be reflected back.

The omnidirectional reflective pet leash is constructed by building a cylindrically reflective sleeve. Formation of the cylindrical retroreflective sleeve can be achieved in two ways: (i) by directly folding the flexible retroreflective sheet to form the cylindrical retroreflective sleeve providing omnidirectional reflectivity; or (ii) by bonding the flexible retroreflective sheet to a panel, which in turn is folded to form the cylindrical retroreflective sleeve, providing omnidirectional reflectivity. The retroreflecting elements may be corner cubes thermally bonded to a polymeric flexible sheet that can be non-reflective. Alternatively, the retroreflecting elements may be microspheres. If microspheres are used as retroreflective elements, the polymeric flexible sheet needs to be reflective and is typically metalized with aluminum or silver. In either case, the retroreflective elements are bonded to the flexible sheet using a transparent binder.

The flexible sheet with retroreflective elements is available from 3M corporation. The trade name for this product is SCOTCHLITE and the flexible polymer is typically PVC and the product is available in a variety of sizes. This flexible reflectorized sheet is preferably thermally bonded to a nylon or polypropylene panel that in turn forms the cylindrical retroreflective sleeve. The panel may have a width equal to or slightly larger than the width of the flexible retroreflective sheet, for example, the panel may have a width of 0.75 inches to 4 inches and is thermally bonded to the flexible reflectorized sheet (such as that sold under the tradename SCOTCHLITE by 3M), accordingly, the flexible retroreflective sheet has a similar width. The thermal bonding binder may be selected from a number of polymeric binders including, but not limited to, polyvinyl chloride, polyethylene, polyurethane, polyvinyl acetate or acrylates. The resultant retroreflective panel is highly flexible and can be manipulated to form the cylindrical retroreflective sleeve by sowing vertical edges of the panel, preferably with double stitching, or gluing or otherwise securing the vertical edges of the panel. The formed cylindrical retroreflective sleeve surrounds the central core of the leash, which substantially sustains the pet pulling tensile forces and provides a cushioning for the handle portion of the leash. The cylindrical retroreflective sleeve integrally surrounds a central cylindrical leash core to thereby create a leash having an external retroreflector surface. Preferably, the external surface of the cylindrical retroreflective sleeve is coated with a transparent, flexible abrasion resistant coating having a refractive index significantly less than that of the retroreflective elements. Preferably, the thickness of the transparent abrasion resistant coating is in the range of 0.002 to 0.010 inches.

The proximal end of the central core of the leash is fashioned to form a loop representing a handle, and the distal end is attached to metallic hardware. This metallic hardware may be a spring clip appointed for attachment to a ring located on a pet collar; or conversely, the collar may be integrated within the construct of the leash, forming a choke leash wherein the metallic hardware is an integrated metallic loop and the leash is formed to go through the metallic loop to create the choke leash. The cylindrical sleeve covers the entire length of the pet leash, including the handle and the choke collar hardware. The ends of the sleeve are terminated by permanent bonding.

In an alternate embodiment, the portion of the pet leash near the distal end carries an adjustable metallic tab component having one or more apertures. The distal end of the leash carries a typical pet leash clamp, which engages with one or more apertures in the metallic tab. This construction provides pet collar having a non-choke function and omnidirectional reflectivity.

Preferably, a transparent abrasion resistant coating is applied to the outer surface of the cylindrical reflective sleeve of the pet leash and is applied as a substantially conformal coating. The reflective sleeve has the flexible retroreflective sheet bonded thereto with the retroreflective elements embedded therein having a corner cube prismatic or microsphere geometry. These transparent retroreflective elements are made from high refractive index transparent materials such as barium oxide-titanium oxide containing glasses. They exhibit a refractive index in the range of 1.9 to 2.2. The transparent abrasion resistant polymeric coating is selected to have a refractive index, which is significantly less than that of the retrorefractive elements. As a result, the incident and reflected light path is not significantly altered even when the incident beam is inclined. The internal reflection process within the retroreflective elements is not deteriorated by the transparent abrasion resistant coating. The polymers suitable for use with the transparent abrasion resistant coating have a refractive index in the range of 1.3 to 1.55.

In addition to this refractive index requirement, the transparent abrasion resistant coating must exhibit excellent mechanical properties, including tensile strength and elongation, in order to provide the required abrasion resistance. The polymer coating must also exhibit superior bond properties to the retroreflective elements and the underlying polymeric sheet. If the bond properties are poor, the transparent abrasion resistant coating may delaminate when the pet leash is subjected to abrasion or flexing and twisting movement. The transparent abrasion resistant coating must have low elastic modulus so that it remains flexible when the pet leash is twisted. A high modulus transparent abrasion resistant coating is not desired since it applies significant stresses at the coating—reflective tape interface resulting in deterioration or fracture of the retroreflective elements.

A number of polymer systems meet these requirements. These polymers may be applied by dipping the cylindrical reflective sleeve and/or reflective pet leash in a polymeric melt or by spraying a polymer composition dissolved in a suitable solvent. Thermosetting resin compositions such as two-component polyurethane may be painted or sprayed over the cylindrical reflective sleeve making up the reflective outer surface of the pet leash. In Table A below there are listed a number of transparent polymer compositions suitable for the pet leash abrasion resistant coating. Also listed are the refractive indexes for the compositions.

TABLE A

| Polymer Name | Refractive Index |
| --- | --- |
| aliphatic thermoplastic polyurethanes | 1.35 to 1.45 |
| Dow Corning OE-4100 Silicone elastomer | 1.4751 |
| Polymethyl tetradecyl siloxane | 1.4550 |
| Poly vinyl acetate | 1.4665 |
| PMMA Poly methyl methacrylate | 1.4893 |
| Cellulose acetate | 1.4750 |
| Ethylene/vinyl acetate copolymer EVA | 1.4820 |

Thermoplastic aliphatic thermoplastic polyurethanes are preferred as compared to aromatic urethanes because of their transparency, resistance to dirt build-up, flexibility ultraviolet radiation degradation resistance. Typically, aliphatic polyurethane has the structure

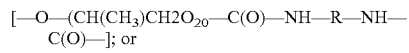
[—O—(CH(CH$_3$)CH2O$_{20}$—C(O)—NH—R—NH—C(O)—]; or

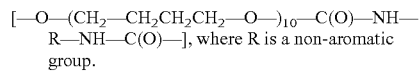
[—O—(CH$_2$—CH$_2$CH$_2$CH$_2$—O—)$_{10}$—C(O)—NH—R—NH—C(O)—], where R is a non-aromatic group.

Rohm and Haas, (Morton International Inc) supplies melt extrudable polyurethane compositions under the trade name designation MORTHANE L430.77 and MORTHANE Brand PN 3429-215. A melt extrusion process may be used to coat the external surface of the cylindrically braided reflective sleeve Aptec Laboratories, 28570, Livingston Avenue, Valencia Calif. 91355-4171. 661-257-1677 markets polyurethane with low elastic modulus for conformal coatings. Two component APTEK transparent unfilled polyurethane compositions of interest include the composition 2503-A/B (www.apteklabs.com/products/2503-AB.pdf) and the composition 2506-A/B (www.apteklabs.com/products/2506.pdf). These two compositions are designed for the encapsulation and protection of devices in applications that require toughness, excellent flexibility and optimum tensile strength, as well as elongation characteristics. APTEK 2503-A/B is curable at 80 C while APTEK 2506-A/B is room temperature curable. Both compositions are dissolved in a solvent and are therefore suitable for brush or spray application.

Bayer provides a number of clear polyurethane coating compositions based on one component or two component systems. Desmodular I aliphatic diisocyanate is often abbreviated to IPDI, CAS 4098-71-9. Polyurethane prepared from IPDI is clear, tough and resists photodegradation and hydrolysis. Isocyanurate based on IPDI is marketed by Bayer under the trade name Z-4470; and is available in a number of solvent blends. Two component polyurethane is commonly formulated with Desmodur Z-4470. Desmodur E polyisocyanates is a single component moisture curable system capable of being diluted in a solvent.

www.setcochemicals.net/resins4.htm. supplies flexible room temperature curing polyurethane coatings ROTOTHANE® 9020. This coating adheres to plastics and leather.

Dow Corning supplies a number of silicone compositions suitable for coating the cylindrical reflective sleeve to provide abrasion resistance. Conformal coatings are materials applied in thin layers (typically a few mils or a fraction of a mm) onto printed circuits or other electronic substrates. They provide environmental and mechanical protection to significantly extend the life of the components and circuitry. Conformal coatings are traditionally applied by dipping, spraying or simple flow coating, and increasingly by select coating or robotic dispensing. Key requirements for the clear coating are low viscosity, enabling application of thin conformal coatings, room temperature cure in reasonable cure time and reasonable hardness. In Table B below there are shown some of the conformal silicone coatings marketed by Dow Corning.

TABLE B

| Product Name | One part/ Two part | Viscosity CPS | Cure | Durometer |
| --- | --- | --- | --- | --- |
| 3-1965 | 1 | 110 | RT 24 Hrs Moisture cure | 29 A |
| 3-1953 | 1 | 360 | RT 24 Hrs Moisture Cure | 26 A |
| 3-1765 | 1 | 150 | RT 24 Hrs Moisture cure | 25 A |
| 3-1753 | 1 | 385 | RT 24 Hrs Moisture cure | 25 A |
| Sylgard 1-4128 | 2 | 450 | 20 min/85 C. | 64 OO |
| I-4105 | 1 | 470 | 10 min/105 C. | 65 OO |
| QI-4010 | 1 | 830 | 15 min/110 C. | 30 A |
| I-2620 | 1 | 250 | RT 72 Hrs | 25 D Abrasion Resistant |
| I-2577 LOW VOC | 1 | 1250 | RT 72 Hrs | 25 D Abrasion Resistant |
| I-2577 | 1 | 725 | RT 72 Hrs | 23 D Abrasion Resistant |

Candidates for silicone conformal coating compositions that meet the low viscosity in the range of 100-250 CPS, room temperature cure in reasonable time period and reasonable hardness are coating compositions 3-1965, 3-1765 and 1-2620. These compositions may be dipped, brush painted or sprayed.

Of particular interest is a Dow Corning OE-4100 optical silicone elastomer, which cures in 2 hour at 150 C with a platinum based catalyst, as discussed in www.dowcorning.com/content/photonic/75-1009B-01.pdf. This composition is specifically developed for use in the optical coating of optical components and is clear, transparent with a refractive index of 1.47.

Polyvinyl acetate is soluble in acetone as well as toluene. Acetone dissolved polyvinyl acetate film has a slightly higher elastic modulus as compared to that dissolved in toluene due to rapid evaporation of acetone. Acetone dissolved polyvinyl acetate is applied to the cylindrically braided surface of the pet leash to form a flexible film which is resistant to twisting action of a pet leash. Polyvinyl acetate is available from Union Carbide under the trade names AYAC, AYAA, AYAF and AYAT depending upon the molecular weight of the polymer.

FIG. 1a is a schematic view of an embodiment of the reflective pet leash showing a leash having a reflective cylindrical sleeve with patterns portions (shown as jewels) attached thereto and covering a central core, shown generally at 10. Reflective pet leash 10 includes a proximal end looped to form an omnidirectionally reflective handle 11, a central pet leash section 12 and a distal end 13 attached to a metallic hardware component 14 (herein shown as a spring clip) operable with a pet collar 15. Preferably, pet collar 15 is a matching collar and comprises a collar core 18 housed in a reflective collar sleeve 19 thereby forming an omnidirectionally reflective pet collar, further having a collar ring 20 for attachment with metallic hardware component 14. Reflective pet leash 10 comprises a central cylindrical core 21 surrounded by a cylindrical reflective sleeve 16 having a show surface 22 comprising a flexible retroreflective sheet (see FIG. 2) and being operable to surround central cylindrical core 21 thereby providing omnidirectional reflectivity to leash 10. Cylindrical reflective sleeve 16 covers handle 11, a central pet leash section 12 and a distal end 13, providing substantially the entire surface of the leash with omnidirectional reflectivity.

The leash completely reflects incident light in the same direction the light was emanated. Due to the cylindrical character of the reflective sleeve, a substantial portion of the sleeve is always at normal orientation to the incoming light beam, that is, the direction at which the reflection from the retroreflective elements is maximized. Retroreflective elements reflect light over a large range of acceptance angles, but the reflection is at a lower intensity. This cylindrical construction effectively reflects the incoming light, as best illustrated by way of FIG. 1d herein which shows a photograph of the leash of FIG. 1a taken with camera flash light showing reflectivity of the cylindrical reflective sleeve. In FIG. 1d, the cylindrical reflective sleeve 16 is shown extremely bright appearance due to the retroreflectors (shown at 17 in FIG. 2) of the leash reflecting the camera flash light.

Preferably, central cylindrical core 21 comprises a braided rope forming a central cylindrical braided rope core, and is preferably composed of braided nylon fibers or braided polypropylene fibers. Cylindrical reflective sleeve 16 is preferably composed of a fibrous material with a flexible retroreflective sheet thermally bonded thereto with polyvinyl chloride, polyvinyl acetate, or polyurethane. Preferably, cylindrical reflective sleeve 16 is composed of a nylon or polypropylene panel to having the flexible retroreflective sheet thermally bonded thereto. The flexible retroreflective sheet may comprise a plurality of corner cube retroreflectors, or may be formed by bonding a plurality of microsphere retroreflectors to a light-reflecting sheet. Optimally, the retroreflectors have a refractive index in the range of 1.9 to 2.2. Preferably, cylindrical reflective sleeve 16 and visa vie the flexible retroreflective sheet and retroreflectors is substantially coated with a conformal transparent polymeric abrasion resistant coating as discussed hereinabove.

Reflective pet leash 10 may include pattern portions 23 overlaid on cylindrical reflective sleeve 16 by thermal bonding or sowing. Pattern portions 23 may be gem stones (as shown), charms, crystals, two-dimensional shapes, or three dimensional shapes, stitching or other design indicia and objects. Preferably, pattern portions 23 have reflective properties. Further, pet leash 10 and/or pet collar 15 preferably includes pet identification tags (I.D. Tags) and/or pet name tags integrated therein.

Figure 1B:
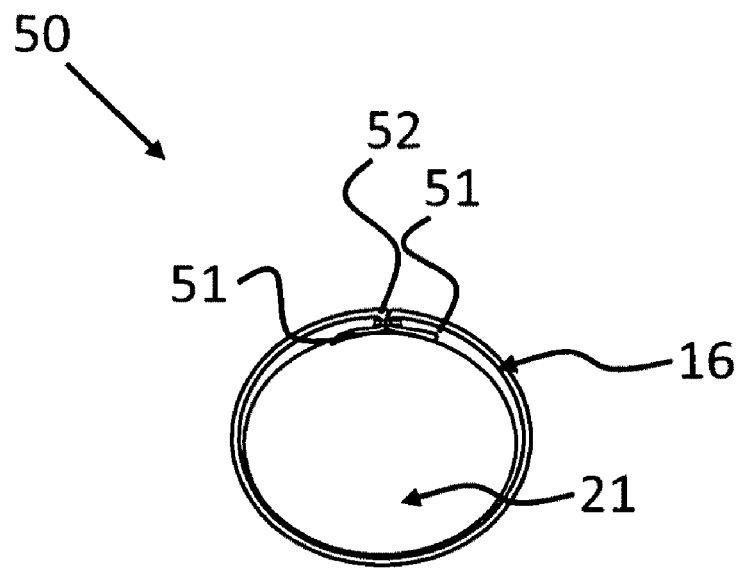
FIG. 1b is a cross-sectional view taken along line X-X of FIG. 1a, showing the circular cross-section of the reflective leash, and further showing the embodiment wherein the cylindrical reflective sleeve has an abutting seam.
Figure 1C:
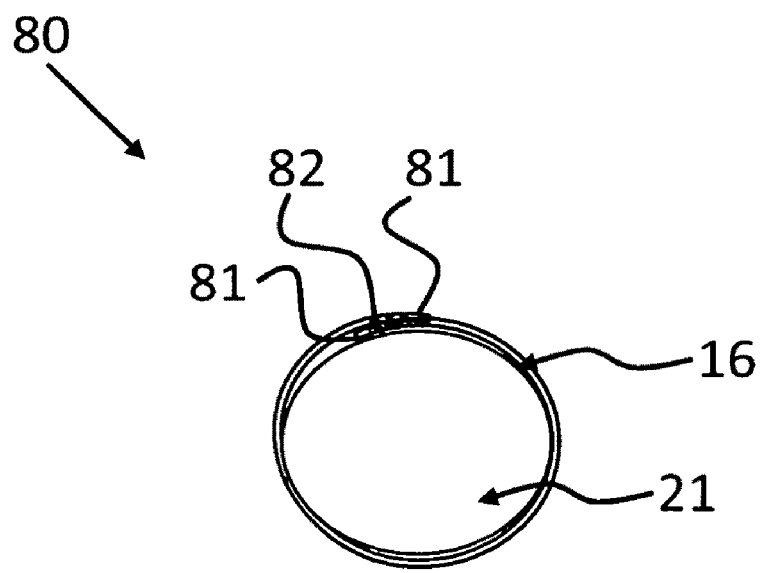
FIG. 1c is a cross-sectional view taken along line X-X of FIG. 1a, showing the circular cross-section of the reflective leash, and further showing another embodiment wherein the cylindrical reflective sleeve has an overlapping seam.
Figure 1D:
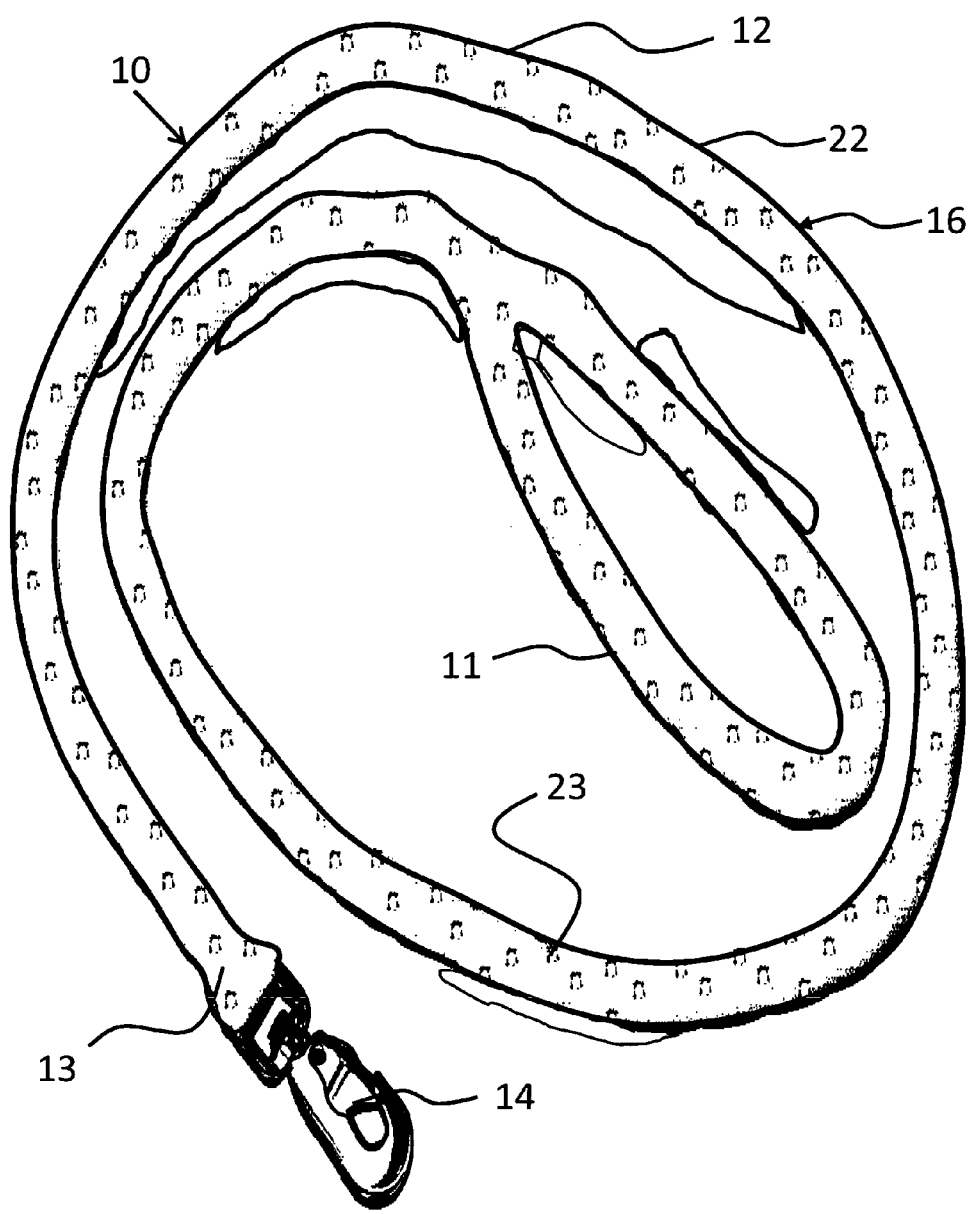
FIG. 1d is a photograph of the leash of FIG. 1a showing the leash with the cylindrical reflective sleeve covering a central core taken with camera flash light showing reflectivity of the cylindrical reflective sleeve.

FIGS. 1b and 1c illustrated the circular cross-section of the reflective leash and construction of the leash involving the surrounding of the central leash core 21 with the cylindrical reflective sleeve 16, showing cross-sectional views taken along line X-X of FIG. 1a. In FIG. 1b cylindrical reflective sleeve 16 surrounds central leash core 21 by abutting vertical edges 51 of cylindrical reflective sleeve 16 and sowing same together to form a seam 52 that is double stitched for durability, shown generally at 50 (alternatively, seam 52 can be achieved by heat pressing or gluing vertical edges 51 together). In FIG. 1c cylindrical reflective sleeve 16 surrounds central leash core 21 by overlapping vertical edges 81 of cylindrical reflective sleeve 16 and sowing, heat pressing or gluing vertical edges 81 together to form a seam 82, shown generally at 80. Optimally, the circular cross-sectional configuration yields 360 degrees of reflective visibility.

Figure 2:
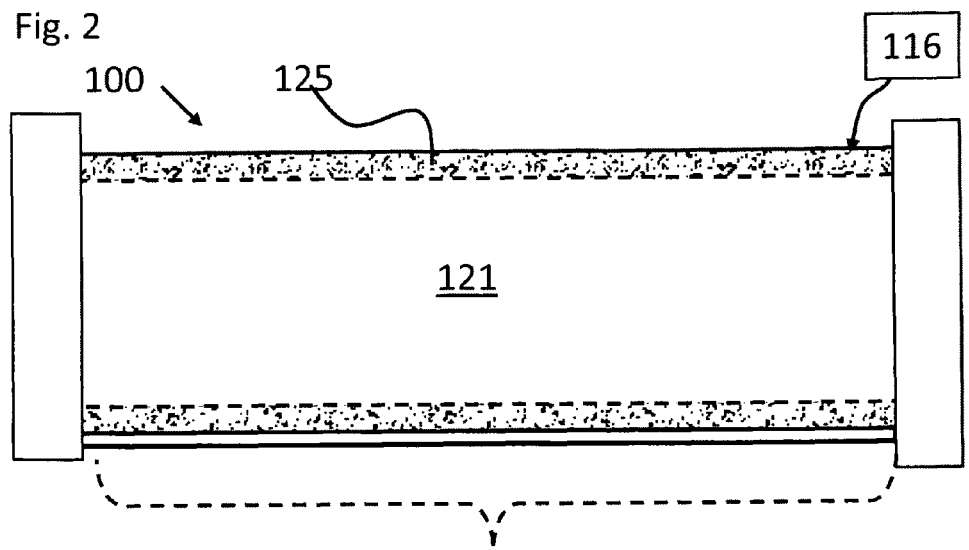
FIG. 2 is a sectional view of the leash taken at cut-out V in FIG. 1a, and illustrating construction details of the cylindrical retroreflective sleeve surrounding the central core of the leash.
Figure 2:
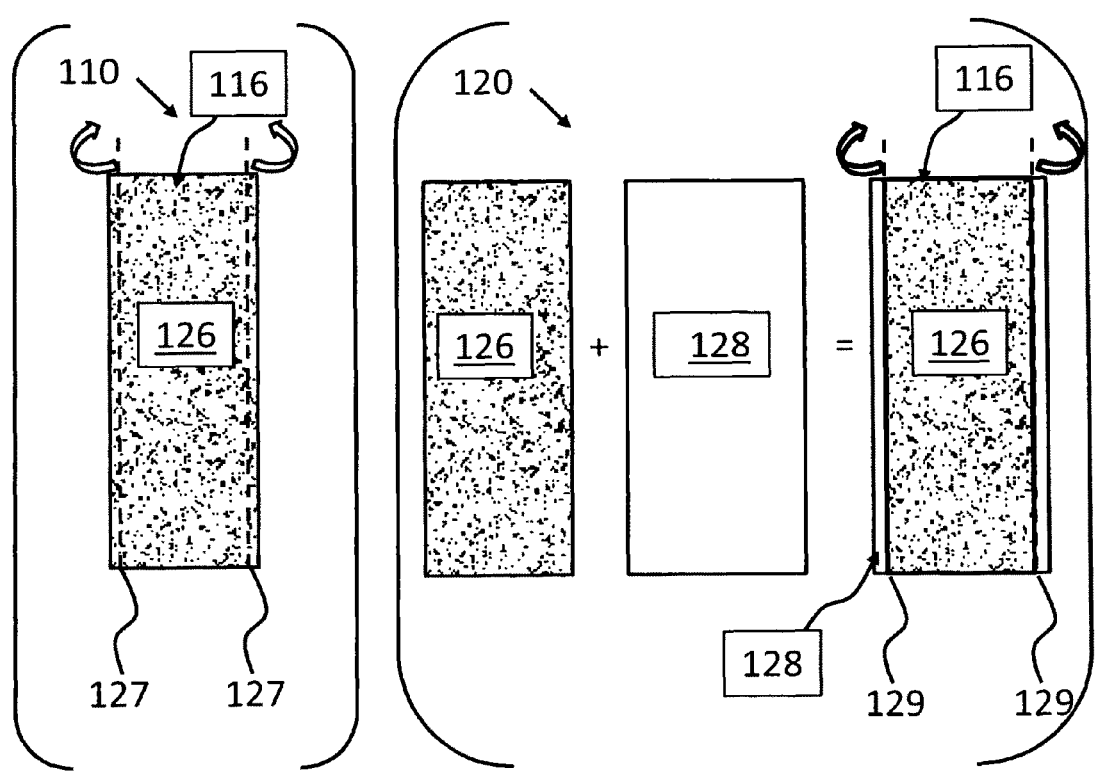

FIG. 2 is a sectional view of the leash taken at cut-out V in FIG. 1a, shown generally at 100. FIG. 2 illustrates details of cylindrical retroreflective sleeve 116 surrounding central core 121. Cylindrical retroreflective sleeve 116 includes retroreflectors 125 bonded thereon. Formation of the cylindrical retroreflective sleeve 116 can be achieved in two ways, shown at 110 and 120. In one manner, shown at 110, formation of cylindrical retroreflective sleeve 116 is achieved by directly folding a flexible retroreflective sheet 126 having vertical edges 127 (demarcated by phantom lines) to form cylindrical retroreflective sleeve 116 providing omnidirectional reflectivity. In another manner, shown at 120, formation of cylindrical retroreflective sleeve 116 is achieved by bonding flexible retroreflective sheet 126 to a panel 128, which in turn is folded at panel vertical edges 129 to form cylindrical retroreflective sleeve 116 providing omnidirectional reflectivity. Optionally, the outer surface of the retroreflective sheet and/or the cylindrical retroreflective sleeve is covered with a transparent conformal flexible abrasion resistant coating.

Figure 3:
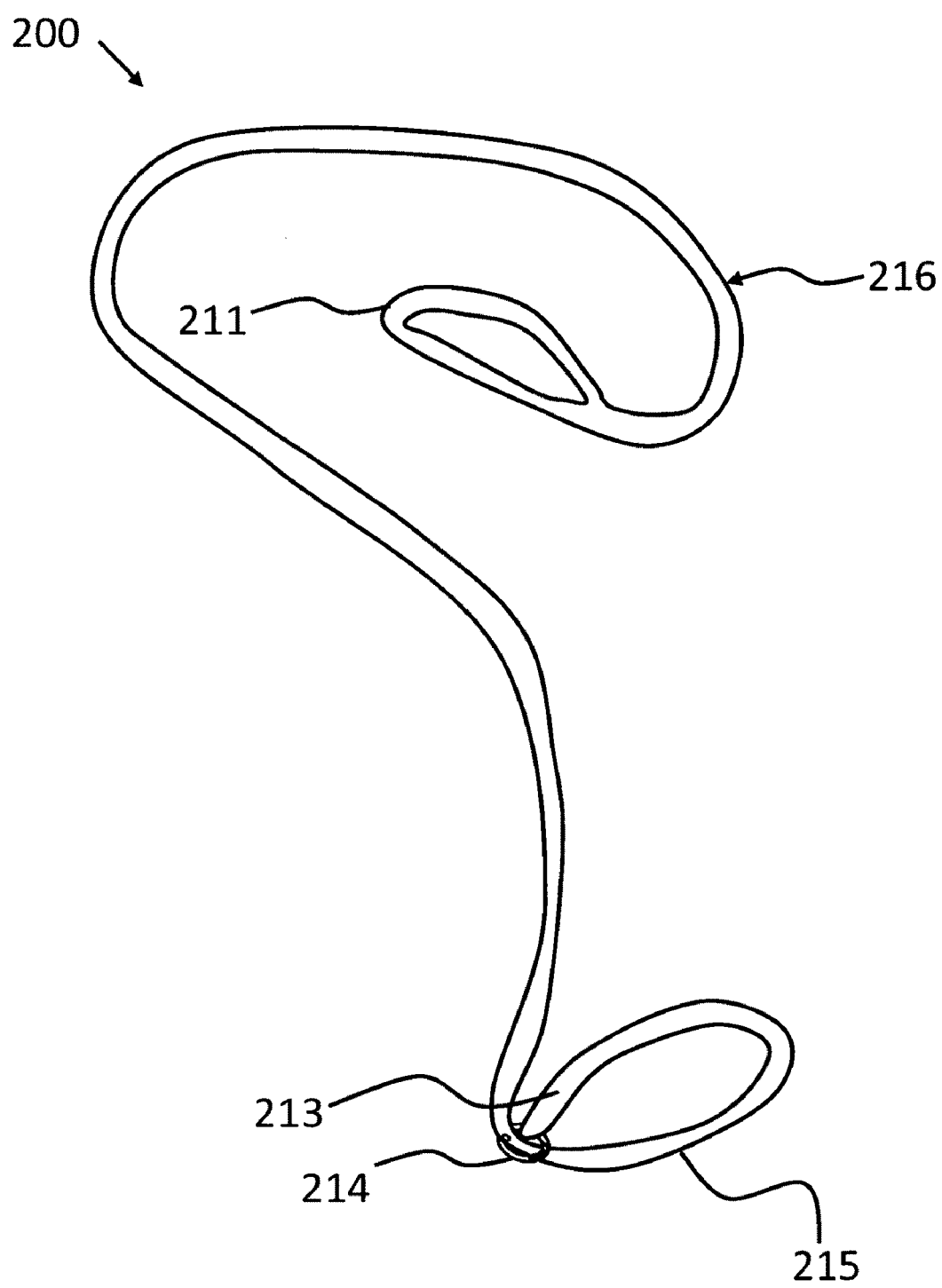
FIG. 3 is a schematic view of an embodiment of the reflective pet leash showing a leash having a reflective cylindrical sleeve covering a central core, wherein the reflective leash includes a proximal end looped to form an omnidirectionally reflective handle, and the distal end of the leash is attached to a mechanical hardware such as a metallic ring, forming a choke collar that encircles the neck of the pet, creating a retroreflective collar integrated within the constructs of the leash itself.

FIG. 3 is a schematic view of an embodiment of the reflective pet leash, shown generally at 200. Leash 200 comprises an outer reflective cylindrical sleeve 216 covering a central core (not seen), wherein the reflective leash includes a proximal end looped to form an omnidirectionally reflective handle 211, and the distal end 213 is attached to mechanical hardware 214 such as a metallic ring, forming a choke collar 215 that encircles the neck of the pet creating a retroreflective collar integrated within the constructs of the leash itself. Herein, reflective cylindrical sleeve 216 does not include any pattern overlays (as shown in FIGS. 1a-d) or inlays (as shown in FIGS. 4a and 4b).

Figure 4A:
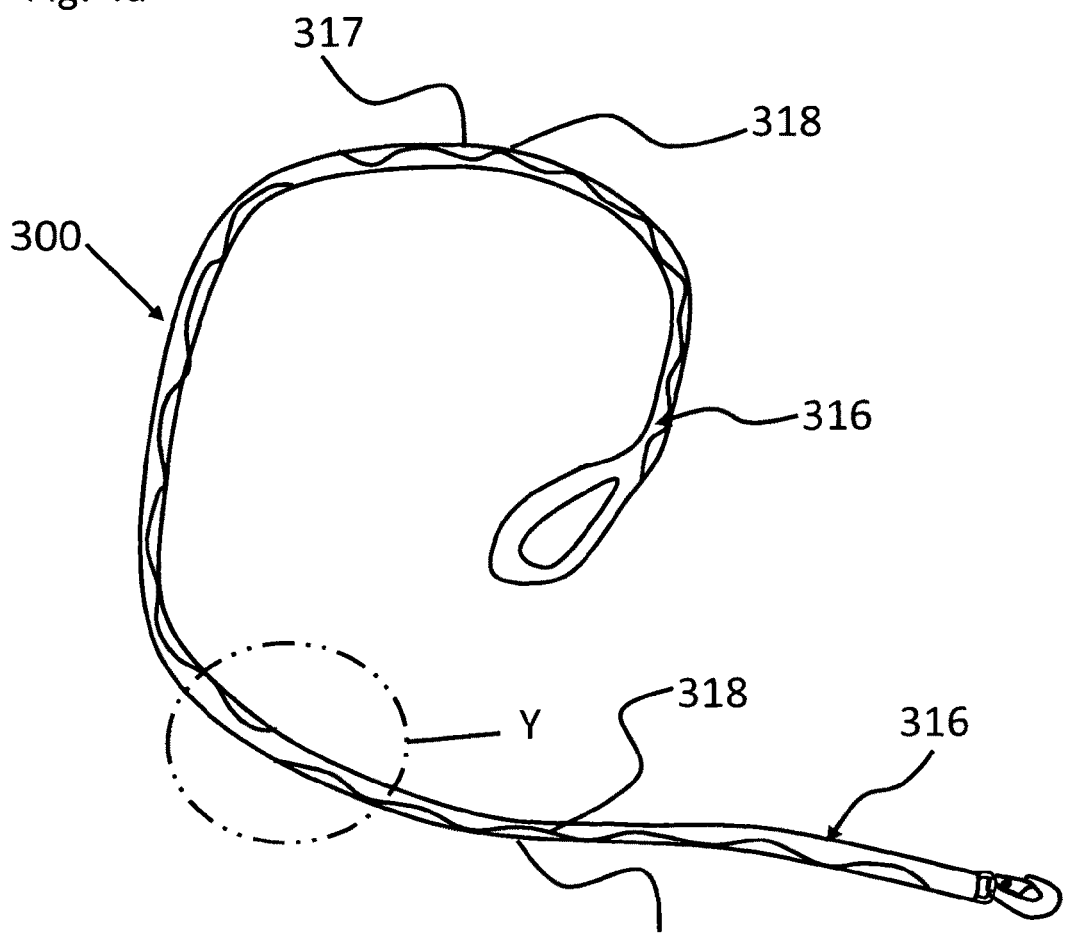
FIG. 4a is a schematic view of an embodiment of the reflective pet leash showing a leash having a reflective cylindrical sleeve with inlaid portions inlaid under the cylindrical reflective sleeve and the cylindrical sleeve includes cutout portions aligned with the inlaid portions to reveal the inlaid portions.
Figure 4B:
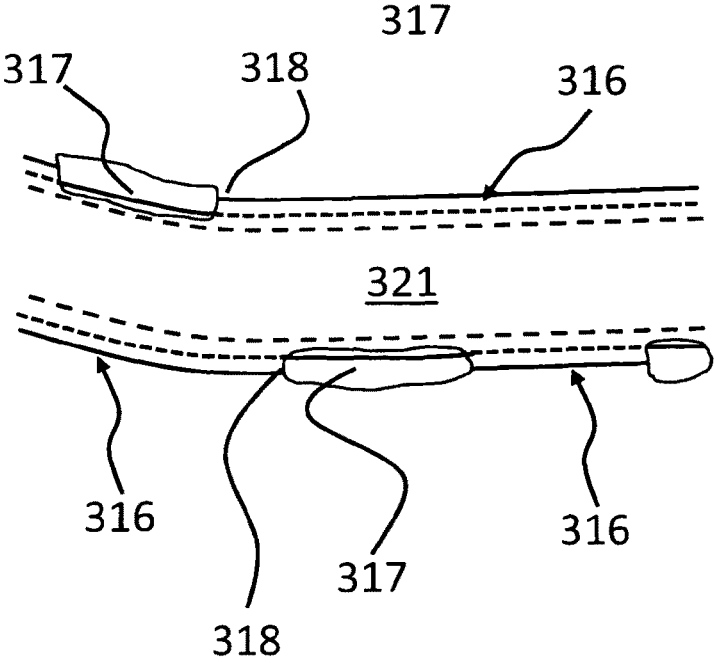
FIG. 4b is a cross-sectional view taken along section Y-Y of FIG. 4a, showing the inlaid portions inlaid under and aligned with the cylindrical reflective sleeve's cutout portions.

FIG. 4a is a schematic view of an embodiment of the reflective pet leash showing a leash 300 having a reflective cylindrical sleeve 316 with inlaid portions 317 inlaid under and revealing through cutout portions 318 of cylindrical reflective sleeve 316. Reflective cylindrical sleeve 316 covers central cylindrical core 321. FIG. 4b is a cross-sectional view taken along section Y of FIG. 4a, showing inlaid portions 317 inlaid under and aligned with cylindrical reflective sleeve's 316 cutout portions 317. Inlaid portions 317 may be selected from a group consisting of gem stones, charms, crystals, two-dimensional shapes, three dimensional shapes, one dimensional shapes, or objects. Preferably, inlaid portions 317 also have reflective properties.

The key features of the omnidirectionally reflective pet leash include, in combination, the features set forth below:

1. a pet leash comprised of a central cylindrical core preferably composed of braided nylon or polypropylene fibers capable of sustaining tensile forces developed by pet leash loads;
2. the central cylindrical core being surrounded by a cylindrically reflective sleeve;
3. the cylindrically reflective sleeve having a flexible retroreflector sheet thermally bonded on the show surface thereof;
4. the flexible retroreflector sheet being prepared by bonding corner cube geometry retroreflectors to a flexible polymeric sheet using a transparent binder;
5. such flexible retroreflector sheet alternately being prepared by bonding microsphere geometry retroreflectors to a metalized reflective flexible polymeric sheet using a transparent binder;
6. an abrasion resistant coating being preferably applied to the cylindrically reflective sleeve and visa vie the flexible retroreflector sheet;
7. twist and flexure forces acting on the abrasion resistant omnidirectionally reflective pet leash being accommodated by the construction of the cylindrical reflective sleeve and the flexibility of abrasion resistant coating;
8. the cylindrical sleeve-covered pet leash substantially reflecting incident light back in the same direction as the incident light, clearly indicating the whereabouts of the pet leash handle, pet leash central portion, and the pet leash collar surrounding the neck;
9. the abrasion resistant omnidirectionally reflective pet leash providing an increased margin of safety for pets and their owners while walking in dimly lit environments, such as parking garages, or inclement weather conditions, where rapidly moving vehicles are encountered.

The omnidirectionally reflective pet leash disclosed herein can be modified in numerous ways without departing from the scope of the invention. The pet collar can be integral with the central core or detachable therefrom via fastening means in the conventional way. These and other modifications are intended to fall within the scope of the invention, as defined by the subjoined claims.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A reflective pet leash, comprising:
   a. a central cylindrical core, which is not braided, that is operable to sustain substantial tensile forces;
   b. a cylindrical reflective sleeve having a show surface comprising a flexible retroreflective sheet and being operable to surround said central cylindrical core thereby providing omnidirectional reflectivity;
   c. said flexible retroreflective sheet having retroreflectors bonded thereto with a transparent bond layer, and
   d. said leash having a proximal end and a distal end, the proximal end being looped to form an omnidirectionally reflective handle, and the distal end being attached to a metallic hardware component operable with a pet collar.

2. A reflective pet leash as recited by claim 1, wherein said pet collar comprises a collar core housed in a reflective collar sleeve thereby forming an omnidirectionally reflective pet collar.

3. A reflective pet leash as recited by claim 1, wherein said central cylindrical core comprises a braided rope forming a central cylindrical braided rope core.

4. A reflective pet leash as recited by claim 3, wherein said central cylindrical braided rope core comprises braided nylon fibers.

5. A reflective pet leash as recited by claim 3, wherein said central cylindrical braided rope core comprises braided polypropylene fibers.

6. A reflective pet leash as recited by claim 1, wherein said cylindrical reflective sleeve is composed of a fibrous material and said flexible retroreflective sheet is thermally bonded to said fibrous material of said cylindrical reflective sleeve with polyvinyl chloride.

7. A reflective pet leash as recited by claim 1, wherein said cylindrical reflective sleeve is composed of a fibrous material and said flexible retroreflective sheet is thermally bonded to said fibrous material of said cylindrical reflective sleeve with polyvinyl acetate.

8. A reflective pet leash as recited by claim 1, wherein said cylindrical reflective sleeve is composed of a fibrous material and said flexible retroreflective sheet is thermally bonded to said fibrous material of said cylindrical reflective sleeve with polyurethane.

9. A reflective pet leash as recited by claim 1, wherein said flexible retroreflective sheet comprises a plurality of corner cube retroreflectors.

10. A reflective pet leash as recited by claim 1, wherein said flexible retroreflective sheet comprises a plurality of microsphere retroreflectors bonded to a light-reflecting sheet.

11. A reflective pet leash as recited by claim 1, wherein said retroreflectors have a refractive index in the range of 1.9 to 2.2.

12. A reflective pet leash as recited by claim 1, wherein said cylindrical reflective sleeve, said flexible retroreflective sheet and said retroreflectors are substantially coated with a conformal transparent polymeric abrasion resistant coating.

13. A reflective pet leash as recited by claim 12, wherein said transparent polymeric abrasion resistant coating has a refractive index in the range of 1.3 to 1.55.

14. A reflective pet leash as recited by claim 12, wherein said transparent polymeric abrasion resistant coating has a thickness in the range of 0.002 to 0.010 inches.

15. A reflective pet leash as recited by claim 12, wherein said transparent polymeric abrasion resistant coating polymer is a member selected from the group consisting of polyurethane, silicone, polymethyl methacralate, and polyvinyl acetate.

16. A reflective pet leash as recited by claim 12, wherein said transparent polymeric abrasion resistant coating polymer is aliphatic polyurethane.

17. A reflective pet leash as recited by claim 12, wherein said transparent polymeric abrasion resistant coating polymer is polyurethane that is melt extruded.

18. A reflective pet leash as recited by claim 12, wherein said transparent polymeric abrasion resistant coating polymer is polyurethane that is dissolved in a solvent and sprayed on said cylindrical reflective sleeve and visa vie said flexible retroreflective sheet and said retroreflectors.

19. A reflective pet leash as recited by claim 12, wherein said transparent polymeric abrasion resistant coating polymer comprises a silicone composition having a viscosity in the range of 100-275 CPS.

20. A reflective pet leash as recited by claim 1, wherein said pet collar is ommidirectionally reflective and functions as a choke collar integrated within said reflective pet leash.

21. A reflective pet leash as recited by claim 1, wherein said metallic hardware component comprises an adjustable metallic tab having a plurality of apertures connected to a pet leash clamp thereby forming said pet collar and said pet collar has non-choke functionality and omnidirectional reflectivity.

22. A reflective pet leash as recited by claim 1, wherein said metallic hardware component comprises a spring clip for removable attachment to said pet collar.

23. A reflective pet leash as recited by claim 1, wherein said leash has a circular cross-sectional configuration to yield 360 degree visibility.

24. A reflective pet leash as recited by claim 1, wherein said cylindrical reflective sleeve has a seam that is double stitched for durability.

25. A reflective pet leash as recited by claim 1, wherein said cylindrical reflective sleeve has a seam formed by heat pressing or glued.

26. A reflective pet leash as recited by claim 1, wherein pattern portions are overlaid on said cylindrical reflective sleeve.

27. A reflective pet leash as recited by claim 26, wherein said pattern portions are selected from a group consisting of gem stones, charms, crystals, two-dimensional shapes, or three dimensional shapes.

28. A reflective pet leash as recited by claim 26, wherein said pattern portions have reflective properties.

29. A reflective pet leash as recited by claim 1, wherein inlaid portions are inlaid under said cylindrical reflective sleeve and said cylindrical sleeve includes cutout portions aligned with said inlaid portions to reveal said inlaid portions.

30. A reflective pet leash as recited by claim 26, wherein said inlaid portions are selected from a group consisting of gem stones, charms, crystals, two-dimensional shapes, or three dimensional shapes.

31. A reflective pet leash as recited by claim 26, wherein said inlaid portions have reflective properties.

32. A process for manufacture of a reflective pet leash, comprising the steps of:
   a. selecting a cylindrical central core, which is not braided, having a proximal end, a distal end, and an external surface;
   b. forming a loop at said proximal end of said cylindrical central core, to thereby form a handle;
   c. attaching said distal end to a mechanical hardware component operable with a pet collar;
   d. selecting a flexible polymer sheet;
   e. coating said flexible polymer sheet with a plurality of retroreflectors using a transparent binder to form a retroreflector coated flexible polymer sheet;
   f. thermally bonding said retroreflector coated flexible polymer sheet to a panel to form a reflective panel having vertical edges;
   g. wrapping said reflective panel around said cylindrical central core, mating said vertical edges of said reflective panel, and securing said vertical edges of said reflective panel to form a cylindrical reflective sleeve housing said cylindrical core therein, said cylindrical reflective sleeve providing omnidirectional reflectivity;
   h. applying a transparent flexible polymeric abrasion resistant conformal coating to substantially cover said omnidirectionally reflective sleeve; and
   i. covering said handle with said omnidirectionally reflective sleeve;
said omnidirectionally reflective pet leash being operable to sustain abrasion, substantial tensile forces, and to accommodate twist and flexure forces due to strength and movement afforded by said central core and omnidirectionally reflective sleeve construction.

\* \* \* \* \*